Sept. 8, 1931.    R. E. MIESSE    1,822,361
ELECTRODE FOR ELECTRICAL DISCHARGE DEVICES
Filed Oct. 13, 1928
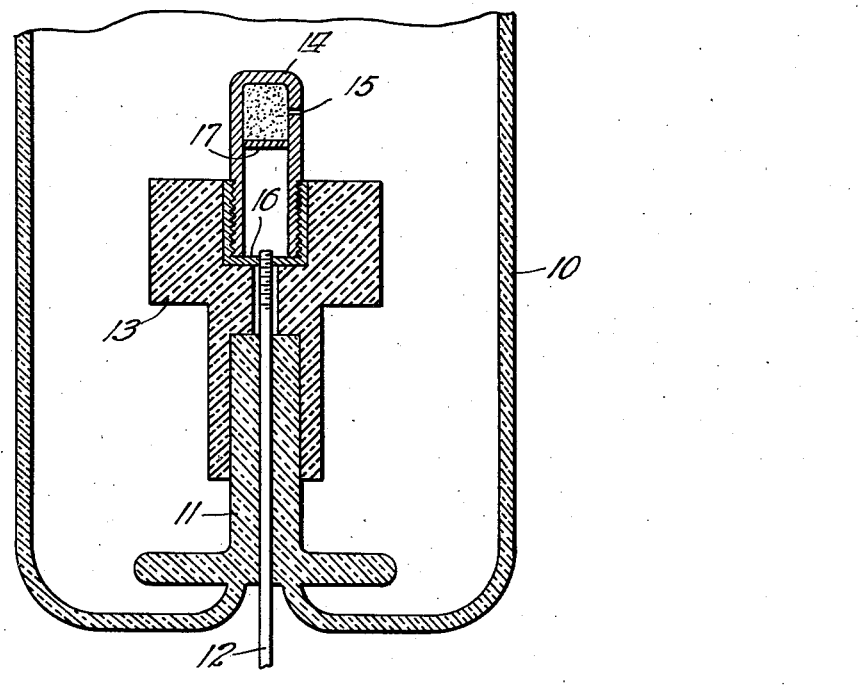
Inventor
Richard E. Miesse Patented Sept. 8, 1931

1,822,361

UNITED STATES PATENT OFFICE

RICHARD E. MIESSE, OF CHICAGO, ILLINOIS, ASSIGNOR TO Q. R. S. DE VRY CORPORATION, OF CHICAGO, ILLINOIS, A CORPORATION OF ILLINOIS

ELECTRODE FOR ELECTRICAL DISCHARGE DEVICES

Application filed October 13, 1928. Serial No. 312,302.

My invention relates to a process for preparing gaseous conduction tubes for operation and use in connection with the carrying out of said process.

My invention contemplates in its preferred form the deposit upon the interior wall of an evacuated tube of a metallic film, which during the operation of the tube, is of use for various purposes, such for instance as the reduction of the cathode drop and the absorption of foreign gases.

In the form of the invention as illustrated herein, the film consists of metallic potassium. Potassium as is well known, cannot be readily handled because of its affinity for oxygen, water vapor and the like. For this reason, I introduce the potassium into the evacuated tube and this introduction is accomplished by forcing a salt of potassium into a container which serves at the same time as the electrode of the device. Intermingled with this potassium salt is a reducing agent.

After the introduction of these elements and after the thorough evacuation of the tube and the removal of occluded gases, the electrode is subjected to bombardment whereby it is heated. Due to this heating the potassium salt is reduced and the potassium escapes through an outlet provided in said electrode and is deposited upon the walls of the tube. The tube is provided with a filling of gas which presently during the operation of the tube will be rendered luminous.

I will describe my invention more in detail by referring to the accompanying drawing which illustrates one embodiment which my invention may take, the same being fragmentarily shown as a longitudinal section of a gaseous conduction device.

In the drawing I show a glass tube 10 having the inturned stem 11 through which the conductor 12 passes, this conductor furnishing a current to the electrode which will be presently described. The glass stem 11 is surmounted by a lava bushing 13.

My improved electrode 14 is formed in the shape of a cylindrical container and has an outlet opening 15. This container is screw-threaded at its open extremity and at this extremity has screwthreaded engagement with a closure or cap element 16. The cap 16 has screwthreaded engagement with the inner extremity of the conductor 12, thus establishing an electrical continuity between the conductor 12 and the electrode 14. Before the parts are assembled, I introduce into the interior of the electrode 14 a mixture consisting of potassium chloride and cerium and pack the same in position preferably under pressure by means of the cap 17. The electrode with the filling and the other parts thus far described are mounted as shown in the illustration, whereafter the tube is entirely evacuated and the occluded gases removed.

Thereupon the electrode 14 is heated preferably by bombardment action and this heating heats the potassium chloride and the cerium with the result that potassium is given off and cerium chloride remains. The chemical action which takes place is as follows:—$3KCl + Ce \rightarrow CeCl_3 + 3K$.

The free potassium passes through the outlet 15 and deposits itself on the walls of the glass surrounding the electrode. When the proper gas filling is supplied to the interior of the tube, the tube is then ready for operation. During operation, the tube becomes heated but this heating alone as a general rule is not sufficient to bring about the reaction as heretofore described which occurs when the electrode 14 is heated to a higher temperature. During the normal operation of the tube, however, the deposited potassium becomes vaporized, thus lowering the cathode drop and also assisting in cleaning up any obnoxious or foreign gases which may be present.

From what has thus been described, the nature of my invention will be readily clear to those skilled in the art and it will also be clear that many modifications may be made from the structure herein shown without departing from the spirit of the invention.

Having, however, thus described one of its forms, what I claim as new and desire to secure by Letters Patent is:

1. In a device of the character described the combination with a vacuous tube, of a hollow electrode therein adapted to serve as a container and having an outlet, an insulating support for said electrode enclosing one end thereof, said electrode being adapted when heated to permit contents thereof to be deposited upon the tube wall, and means extending exteriorly of said tube for conducting current to said electrode.

2. In a device of the character described the combination with a vacuous tube, of a hollow electrode therein adapted to serve as a container and having an open end and outlet, an insulating support for said electrode, a closure for said open end seated in said insulating support, said electrode being adapted when heated to permit contents thereof to be deposited upon the tube wall, and means extending exteriorly of said tube for conducting current to said electrode.

In witness whereof, I hereunto subscribe my name this 2nd day of October, A. D. 1928.

RICHARD E. MIESSE.